United States Patent [19]
Heath

[11] 3,822,897
[45] July 9, 1974

[54] MUD FLAP

[76] Inventor: Gerald Heath, 8775 Hudson St., Vancouver, British Columbia, Canada

[22] Filed: Mar. 7, 1972

[21] Appl. No.: 232,418

[52] U.S. Cl. ................................. 280/154.5 R
[51] Int. Cl. .................................. B62d 25/16
[58] Field of Search ...................... 280/154.5 R

[56] References Cited
UNITED STATES PATENTS
| | | | |
|---|---|---|---|
| 3,051,508 | 8/1962 | Federspiel | 280/154.5 R |
| 3,095,215 | 6/1963 | Black | 280/154.5 R |
| 3,650,543 | 3/1972 | Evans | 280/154.5 R |

Primary Examiner—Robert R. Song
Attorney, Agent, or Firm—Carver and Company

[57] ABSTRACT

Mud flap for use by wheeled vehicles, flap having an upper portion secured to the vehicle rearward of wheel and a lower portion secured to upper portion by weakened portion. Weakened portion has lower tensile strength than remaining portion of flap so that, when vehicle reverses against curb and flap is trapped between curb and wheel, tensile stress in flap causes it to tear along weakened portion. Weakened portion has a cross-sectional area reduced from that of remaining portion of flap by providing a groove, a row of perforations, or by joining the upper portion to the lower portion by a plurality of threads.

1 Claim, 6 Drawing Figures

PRIOR ART

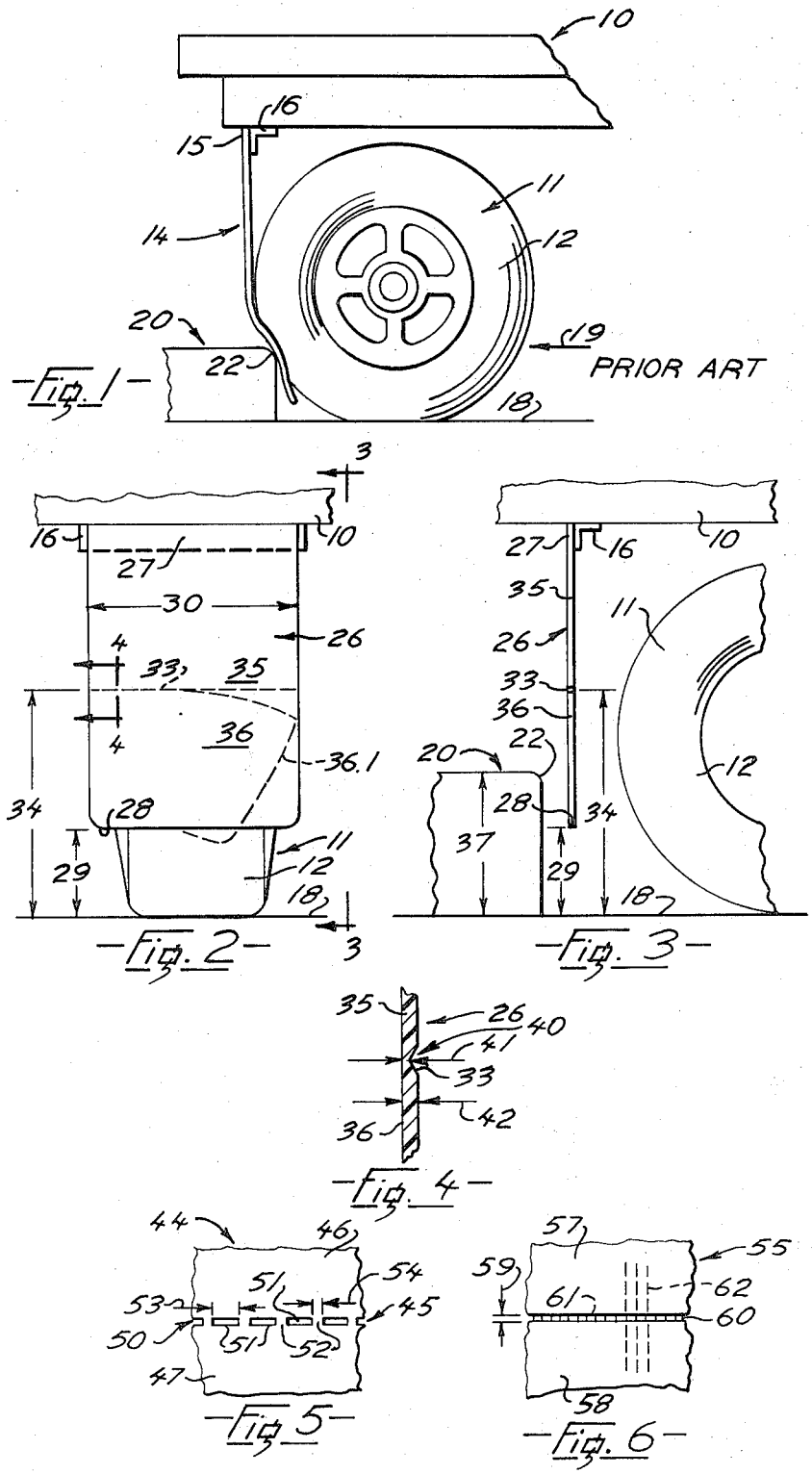

MUD FLAP

BACKGROUND OF THE INVENTION

1. Field of the Invention

The invention relates to a mud flap for wheeled vehicles, particularly adapted for, but not limited to, use on trucks.

2. Prior Art

Most trucks are fitted with mud flaps adjacent the rear wheels to deflect material thrown upwards by the rear wheels. These flaps are generally made from a heavy gauge rubberized material and are secured adjacent an upper edge thereof to a bracket, the bracket being held onto body work of the truck above and rearward of the rear wheels. Commonly, when the truck reverses against a curb, the mud flap is trapped between an upper corner of the curb and the rear wheel. With further reversing, the mud flap is subjected to increasing tensile stresses which often rip the flap away from the bracket, or sometimes pull the bracket from the truck causing body work damage. Thus mud flap protection is lost, and repair is necessary.

Various devices have been invented to reduce the difficulties above, for example U.S. Pat. No. 3,027,178 issued to Eaves in 1962. This patent teaches a relatively stiff mud flap which is shaped to conform to the tire when pushed against the rear wheels when the truck reverses against a curb or loading bay. This is a relatively expensive device designed primarily to reduce "sailing" of the flap at high speed.

SUMMARY OF THE INVENTION

The invention reduces difficulties and disadvantages of the prior art by providing a mud flap which is adapted to tear along a particular portion when trapped between a wheel and a curb. The mud flap has upper and lower portions separated by a weakened portion which extends transversely across width of the flap. The weakened portion has a lower overall tensile strength than a remaining portion of the flap remote from the weakened portion so that when the mud flap is trapped between the curb and the tire, tensile forces on the flap cause the flap to tear along the weakened portion, rather than tear at the bracket, or pull the bracket from the truck. The weakened portions can be introduced into the mud flap by several means, for example a row of perforations extending across the flap, or by making the weakened portion thinner than the remaining portion of the flap.

A detailed description following, related to drawings, gives exemplification of apparatus according to the invention which, however, is capable of expression in structure other than that particularly described and illustrated.

DESCRIPTION OF THE DRAWINGS

FIG. 1 is a fragmented side elevation of a rear wheel of a truck fitted with a prior art mud flap, the truck being reversed against a curb, FIG. 2 is a fragmented rear elevation of a mud flap according to the invention and the rear wheel, FIG. 3 is a fragmented side elevation as seen from 3—3 of FIG. 2, showing a portion of a curb, FIG. 4 is a fragmented detail section on 4—4 of FIG. 3, FIG. 5 is a fragmented detail rear elevation of an alternative mud flap showing a second means of providing a weakened portion, FIG. 6 is a fragmented detail rear elevation of a further alternative mud flap showing a third means of providing a weakened portion.

DETAILED DISCLOSURE

FIG. 1 (Prior Art)

A portion 10 of a rear of a truck (not shown) has a rear wheel 11 having a tire 12. A prior art mud flap 14 has an upper end 15 secured to a bracket 16, the bracket being secured to truck framework or body work of the portion 10. The tire 12 runs on pavement 18 which terminates at a curb 20. The curb has a corner 22 and when the truck reverses in a direction of an arrow 19 against the curb the mud flap 14 is trapped between the corner 22 and the tire 12. Further reversing applies a tensile force to the mud flap 14 which force, in some instances, rips the bracket 16 from the truck, or tears the mud flap in two. Thus mud flap protection is lost and re-fitting a replacement mud flap sometimes involves extensive body work repair.

FIGS. 2 and 3

With reference to FIG. 2, the rear portion 10 of the truck is shown fitted with a mud flap 26 which is a sheet of flexible material having an upper end 27 secured to the bracket 16 and a lower edge 28, and when the flap hangs vertically, the edge 28 is spaced from the pavement 18 a height 29 about six inches. The mud flap has a width 30 which is wider than the tire 12 and has an essentially constant thickness as shown. The flap 26 has a weakened portion 33 extending as a generally horizontal band (shown as a broken line) across the width of the flap and spaced a height 34, about twelve inches, from the pavement 18. The flap has two portions separated by the weakened portion 33, namely an upper portion 35 and a lower portion 36.

The weakened portion has reduced tensile strength such that, when a tensile force is applied normally to width of the flap, the weakened portion fails under tension before remaining portions of flap remote from the weakened portion. The strength reduction can be attained by reducing flap material strength at the weakened portion by local heating or chemical reaction during manufacture, or by locally reducing total transverse cross-sectional area. Several alternative means to incorporate a weakened portion of reduced cross-sectional area in a mud flap are described with reference to FIGS. 4, 5, and 6.

With reference to FIG. 3, the curb 20 has a height 37 above the pavement 18, which height is greater than the height 29 and less than the height 34. When the truck reverses against the curb, the lower portion 36 of the flap is trapped between the tire and the curb, similar to the flap 14 in FIG. 1. For most purposes the height 34 is generally equal to axle height of the wheel, plus or minus a few inches.

When the truck reverses further against the curb 20, as the lower portion 36 is trapped between the tire and the curb, the flap is subjected to a tensile force. If the force is sufficiently high the flap finally tears along the weakened portion causing the lower portion 36 to hang as shown in broken outline at 36.1 in FIG. 2, or to be separated from the upper portion. If the lower portion 36 remains hanging from the upper portion after the truck moves forward, it is best to tear off completely by hand the portion 36, thus leaving the upper portion 35 remaining on the bracket 16. Thus the bracket 16 is not ripped from the truck and the upper portion of the mud flap remains on the truck providing some measure of protection against splash. Thus negligible damage is incurred by the vehicle and a temporary shorter flap remains on the truck providing some protection until a new flap can be fitted, which fitting is replacement of the flap and does not incur repair to body work of the truck.

FIG. 4

The weakened portion 33 is a groove 40 extending across the flap in which the flap material of the groove has a reduced cross-sectional area having a thickness 41, which thickness is materially less than thickness 42 of the mudflap elsewhere. Assuming unchanged absolute strength of the material at the band, ratio of the thicknesses 41:42 is approximately equal to ratio of overall strength of the portion 33 to overall strength of the mud flap material remote from the band. Hereinafter such a ratio is termed strength reduction ratio and a suitable ratio can be selected by experiment. A ratio of about one to five has been found adequate. Thus, under tensile load, stress is higher in the band than in other portions of the flap, causing failure first at the band. Reduced thickness of the portion 33 can be moulded into the flap during manufacture or it can be cut or melted into the flap after cutting the flap from sheet material.

ALTERNATIVES AND EQUIVALENTS

FIG. 5

A first alternative mud flap 44 has an alternative weakened portion 45 provided by a row of perforations 50, which perforations reduce cross-sectional area and correspondingly reduce tensile strength of the flap at the weakened portion. The mud flap 44 has upper and lower portions 46 and 47 separated by the alternative weakened portion 45, and, as mud flaps are commonly made of elastomeric material, the perforations 50 can be produced by punching or moulding. The perforations include a series of elongated slots severally 51 extending in end-to-end relationship, fingers 52 of mud flap material between the slots joining the upper portion 46 to the lower portion 47. A typical slot 51 has a length 53 and a typical finger 52 has a width 54. By selecting a ratio of the width 54 of the finger to the length 53 of the slot a required strength reduction ratio of about one to five can be obtained. Also the slots can be oval or circular provided a sufficient width of finger extends between the slots.

FIG. 6

A second alternative mud flap 55 has upper and lower portions 57 and 58 separated by a gap 60, the gap being bridged by threads 61 forming an alternative weakened portion. The gap 60 has a width 59 sufficient to restrict flow of debris through the gap. The threads 61 joining the upper and lower portions extend transversely across the gap and are moulded into the mud flap during manufacture or are bonded to the upper and lower portions, and have a lower overall strength than remaining portions of the flap.

If the mud flap is made from woven fabric having warp and weft threads coated with elastomeric sealing material, the weakened portion can be provided by introducing a local discontinuity as a band across the fabric, thus reducing strength at the band. Warp threads severally 62 shown in broken outline extend across the gap 60 and if not coated with elastomeric material and are fewer in number than in the remaining portion of the flap will be weaker than the remaining portion of the flap. A required strength reduction ratio can be obtained by having a ratio of the number of warp threads extending across the gap 60 to the number of warp threads in the remaining portion of the flap to be about 1 to 5.

I claim:

1. A mud flap for use by a vehicle having a wheel rotatable on an axle, the mud flap being a sheet of flexible material having essentially constant thickness, spaced upper and lower ends, and a width defined by spaced side edges, the upper end of the flap to be secured to the vehicle rearward of the wheel, wherein:
    a. the mud flap has a row of perforations extending generally horizontally across the flap at a heighth generally equal to axle heighth of the wheel, the row of perforations dividing the mud flap into upper and lower portions,
    b. the perforations being defined by a plurality of spaced fingers extending between the upper and lower portion and the space between the fingers defining the slots of the perforations,
    c. said slots being elongated and extending in an end to end relationship across the width of the flap,
    d. each of said slots having a length,
    e. each of said fingers having a width, and
    f. the ratio of the width of said finger to the length of said slot being about 1 to 5 so that the strength of the mud flap across the row of perforations is approximately one fifth of the strength of the flap remote from the perforations.

* * * * *